US 6,487,052 B1

(12) United States Patent
Macpherson et al.

(10) Patent No.: US 6,487,052 B1
(45) Date of Patent: Nov. 26, 2002

(54) NON-CONTACT MAGNETIC LATCH FOR DISC DRIVE ACTUATOR (75) Inventors: Aaron S. Macpherson, Fort Collins, CO (US); Robert A. Alt, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 90 days.

(21) Appl. No.: 09/605,154

(22) Filed: Jun. 28, 2000

Related U.S. Application Data (60) Provisional application No. 60/158,878, filed on Oct. 12, 1999.

(51) Int. Cl.[7] .................................................. G11B 5/54
(52) U.S. Cl. ................................ 360/256.2; 360/254.8
(58) Field of Search ........................... 360/256.2, 256.3, 360/254.7, 254.8

(56) References Cited

U.S. PATENT DOCUMENTS

| | | | | |
|---|---|---|---|---|
| 5,189,575 A | | 2/1993 | Onooka et al. ............. 360/105 |
| 5,404,257 A | | 4/1995 | Alt ............................... 360/105 |
| 5,453,891 A | * | 9/1995 | Takemoto ................. 360/256.2 |
| 5,581,424 A | | 12/1996 | Dunfield et al. ............ 360/105 |
| 5,675,455 A | * | 10/1997 | Matsumoto ............... 360/256.2 |
| 5,805,384 A | | 9/1998 | Bronshvatch et al. ....... 360/105 |
| 5,877,922 A | | 3/1999 | Boutaghou ................... 360/105 |
| 5,956,213 A | * | 9/1999 | Dague et al. ............. 360/256.2 |
| 5,973,887 A | | 10/1999 | Cameron .................... 360/105 |
| 6,108,173 A | * | 8/2000 | Iwabuchi .................. 360/256.2 |
| 6,137,658 A | * | 10/2000 | Matsuzaki et al. ........ 360/256.2 |
| 6,252,744 B1 | * | 6/2001 | Kelemen ................... 360/256.2 |
| 6,317,296 B1 | * | 11/2001 | Stefansky et al. ......... 360/256.2 |

* cited by examiner

Primary Examiner—Jefferson Evans
(74) Attorney, Agent, or Firm—Derek J. Berger (57) ABSTRACT Disclosed is a non-contact magnetic latch mechanism for holding a disc drive actuator in its park position. The latch includes a magnetically permeable element coupled to the actuator. The magnetically permeable element is positioned so as to be attracted to the magnetic field produced by the actuator voice coil magnets when the actuator is in or near its park position. The size, shape and location of the magnet may be selected so as to vary the latch torque and the range of influence of the latch on the actuator.

7 Claims, 6 Drawing Sheets

NON-CONTACT MAGNETIC LATCH FOR DISC DRIVE ACTUATOR

CROSS REFERENCE TO RELATED APPLICATIONS

This application claims the benefit of U.S. Provisional Application No. 60/158,878, filed Oct. 12, 1999.

FIELD OF THE INVENTION

This invention relates generally to the field of hard disc drive data storage devices, and more particularly, but not by way of limitation, to latch mechanisms for holding an actuator mechanism of a disc drive at a park position in the absence of power.

BACKGROUND OF THE INVENTION

Disc drives of the type known as "Winchester" disc drives, or hard disc drives, are well known in the industry. Such disc drives magnetically record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 15,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative pneumatic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspension tabs.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. An actuator bearing housing is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator bearing housing opposite to the coil, the actuator bearing housing also typically includes a plurality of vertically aligned, radially extending actuator head mounting arms, to which the head suspensions mentioned above are mounted. When controlled DC current is applied to the coil, a magnetic field is formed surrounding the coil which interacts with the magnetic field of the permanent magnets to rotate the actuator bearing housing, with the attached head suspensions and head assemblies, in accordance with the well-known Lorentz relationship. As the actuator bearing housing rotates, the heads are moved radially across the data tracks along an arcuate path.

The movement of the heads across the disc surfaces in disc drives utilizing voice coil actuator systems is typically under the control of closed loop servo systems. In a closed loop servo system, specific data patterns used to define the location of the heads relative to the disc surface are prerecorded on the discs during the disc drive manufacturing process. The servo system reads the previously recorded servo information from the servo portion of the discs, compares the actual position of the actuator over the disc surface to a desired position and generates a position error signal (PES) reflective of the difference between the actual and desired positions. The servo system then generates a position correction signal which is used to select the polarity and amplitude of current applied to the coil of the voice coil actuator to bring the actuator to the desired position. When the actuator is at the desired position, no PES is generated, and no current is applied to the coil. Any subsequent tendency of the actuator to move from the desired position is countered by the detection of a position error, and the generation of the appropriate position correction signal to the coil.

Figure 2:
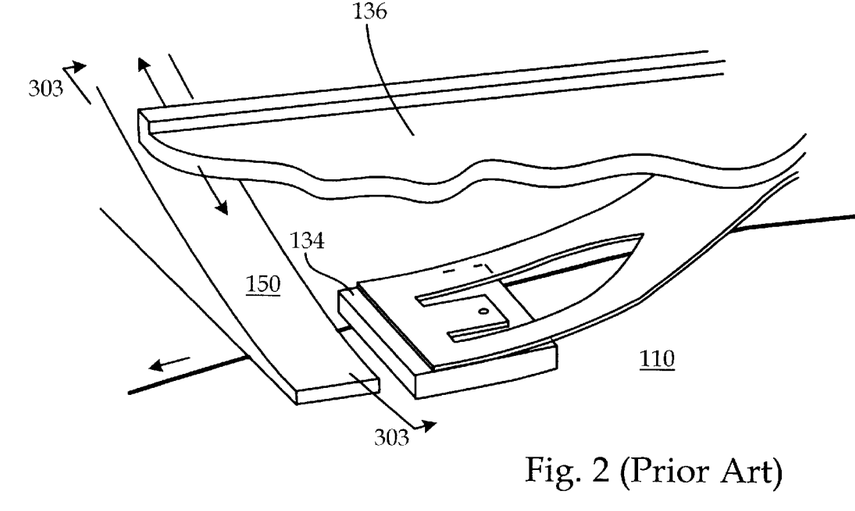
FIG. 2 shows a perspective view of a head being loaded or onto a ramp.

When power to the disc drive is lost, servo control of the current flow in the coil of the voice coil actuator is lost. In the absence of DC current flowing in the coil, the actuator is free to move in response to such things as mechanical shock, air movement within the disc drive or mechanical bias applied to the actuator by the printed circuit cable (PCC) used to carry signals to the coil and to and from the heads mounted on the actuator. Since a power loss also means that the spindle motor will also cease to rotate the discs, the air bearing supporting the heads also begins to deteriorate and contact will be made between the heads and the discs. Because of this, it is common practice in the industry to monitor input power to the disc drive, and, at the detection of power loss, to drive the actuator to a park position and latch it there until power to the disc drive is restored. One way in which the heads may be held at positions spaced from the discs is by providing ramps at the outer diameters of the discs. The ramps guide the heads away from the discs by forcing biased load suspension tabs away from the planes of the discs as the actuator moves into its park position. Such an arrangement can be seen in FIG. 2.

Once the actuator is in the park position, it is common to provide a primary latch mechanism which serves to prevent the actuator from being moved out of the park position when the drive is subjected to shock. Many forms of such latches have been used and are disclosed in the art. Examples are inertial latches and air latches. Inertial latches move in response to external shocks to lock the actuator in place. An air latch holds the actuator in place when the actuator reaches its park position, but moves to an unlatch position in response to airflow generated by the spinning discs when power is restored to the drive. One problem associated with these latches is that under certain conditions they do not effectively prevent movement of the actuator. For example, while high levels of shock will cause an inertial latch to move to engage the actuator, lower levels of shock, especially repeated shocks resulting from vibration, can be insufficient to move the inertial latch but sufficient to move the actuator out of the park position. In the case of an air latch, external shocks can move the latch out of engagement with the actuator, leaving the actuator free to rotate out of the park position. For this reason, it is known to provide a secondary latch mechanism which prevents the actuator from leaving the park position even under circumstances when the primary latch mechanism is ineffective.

Figure 3:
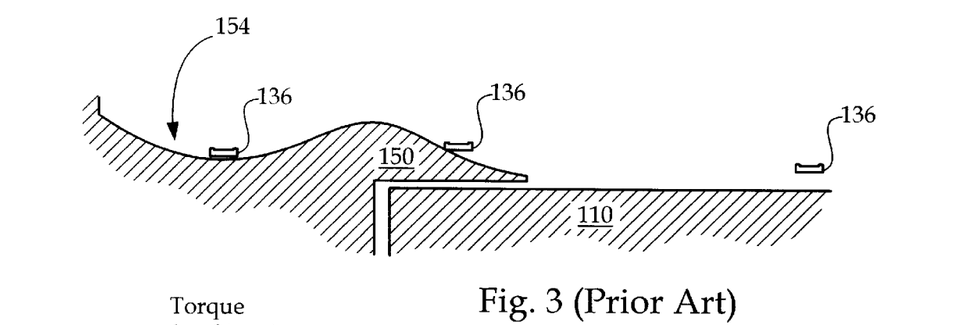
FIG. 3 shows a cross-sectional view of the load suspension tab, ramp and detent of FIG. 3 illustrating the position of the tab at various points between its park and read positions.
Figure 4:
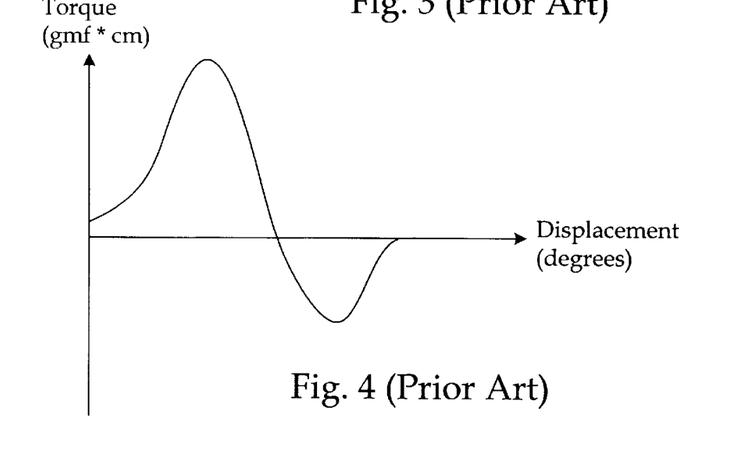
FIG. 4 graphically portrays the latch torque provided by the detent versus the angular displacement of the actuator as it leaves the park position as shown in FIG. 3.

This secondary latch mechanism is known to take the form of a detent in the surface of the ramp. This is illustrated in FIG. 3 which shows a load suspension tab 136 in three positions: seated in the detent 154 at left, ascending or descending the sloped ramp surface 152 in the center, and flying above the surface of the disc 110 at right. As may be seen in FIG. 4, the detent 154 increases the torque required to drive the actuator out of the park position against the bias of the load suspension tabs 136, so the actuator will remain parked even when the primary latch is ineffective. However, there are many disadvantages associated with the use of a detent as a secondary latch mechanism, as will be explained below.

One disadvantage of these detent latch designs is that the torque required to move the actuator out of the park position decreases when a disc drive is depopulated, i.e., when discs are removed from the drive. Because heads and corresponding load suspension tabs are also removed, the overall bias provided by the load suspension tabs against the ramps is reduced, thereby decreasing the overall secondary latch torque. Shocks to the disc drive which are too low to activate an inertial latch but high enough to cause the actuator to overcome the reduced secondary latch torque could allow the actuator to leave the park position and contact the stationary disc, causing damage to the discs and heads.

Figure 9:
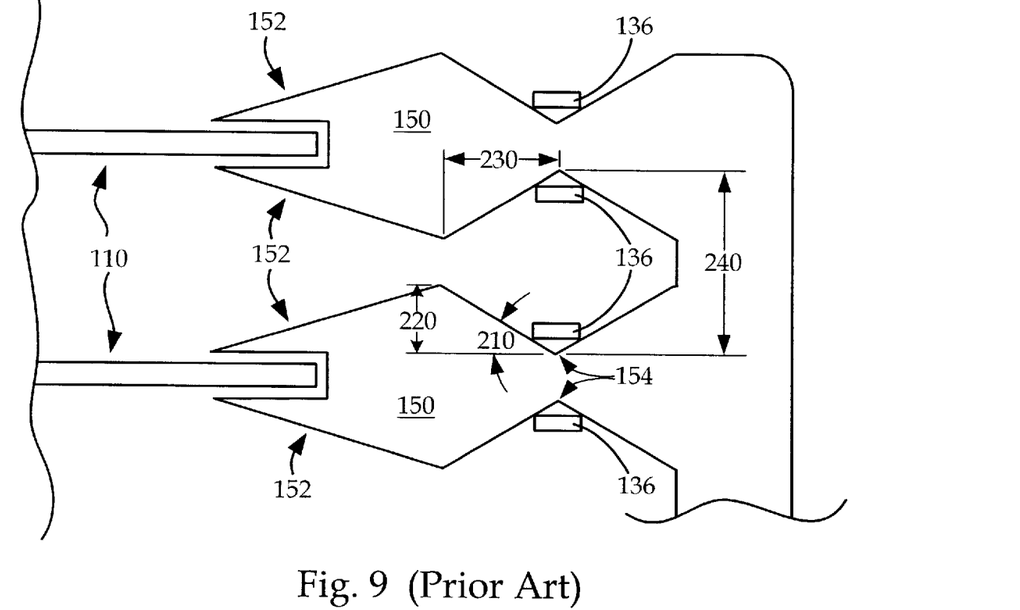
FIG. 9 depicts load suspension tabs seated in the detents of corresponding associated ramp members.

Another problem presented by these detent latch designs is that the detent depth permits excess vertical acceleration of the heads when the drive is subject to high levels of shock. As can be seen in FIG. 9, detents 154 which face each other define a large distance 240 over which a head may travel when the drive is subjected to shock, resulting in greater acceleration and therefore velocity, increasing the likelihood of damage when the tab 136 contacts the opposing detent.

Another problem with these detent latch designs is that they are by nature limited in both "latch torque," i.e., the force by which they prevent movement of the actuator out of its park position, and "range of influence," i.e., the range of actuator rotation over which they exert torque on the actuator. Referring to FIG. 9, latch torque is increased by increasing the angle 210, such that increasing amounts of torque are required to drive the actuator against the bias force provided by the load suspensions tabs 136 against the detents 154. The latch torque is limited because if the angle 210 is increased too much, the load suspension tabs 136 can be bent or broken when forced against the detent surface. The range of influence 230 of the detent latch is limited because the detent depth 220 is limited by the spacing of adjacent heads from one another. As can be seen in FIG. 9, if the depths 220 of the detents 154 were increased too much, the heads supported by the suspension load tabs 136 would collide with one another when the actuator reached its park position. If latch torque is to be maintained at a suitable level, angle 210 must also be maintained and the range of influence 230 is limited by these factors.

A related problem with these detent latch designs is that the latch torque cannot be varied independently of the range of influence. If the latch torque is increased, for example, by increasing the angle 210 of the detent 154, the range 230 over which the detent latch is effective is necessarily shortened because of detent depth limit 220.

The limited range of influence of these detent latch designs can also affect the structure of the primary latch mechanism when an inertial latch is used. When manufacturing tolerances are taken into account, a one-piece actuator may rotate as little as 1.5 degrees before escaping the detent latch. When the drive is subject to shock under these conditions, the actuator may rotate past its point of engagement with the inertial latch before the inertial latch can move to its latching position, thereby allowing the actuator to descend the ramp and contact the disc surface. A solution to this problem in the past involved constructing a two-part latch in which an "engagement" part of the latch was moved more quickly by an "inertial" part to compensate for the slow movement of the "inertial" portion. However, this inertial latch structure involves additional cost associated with additional manufacturing steps, tooling, and packaging space in the VCM area of the drive.

SUMMARY OF THE INVENTION

The present invention is an improved secondary latch mechanism for holding a disc drive actuator in its park position. The secondary latch mechanism is a non-contact magnetic latch which includes a magnetically permeable element coupled to the actuator. The magnetically permeable element is positioned so as to be attracted to the magnetic field produced by the voice coil magnets when the actuator is in or near its park position. Additional features and benefits will become apparent upon a review of the attached figures and the accompanying description.

DETAILED DESCRIPTION OF THE INVENTION

Figure 1:
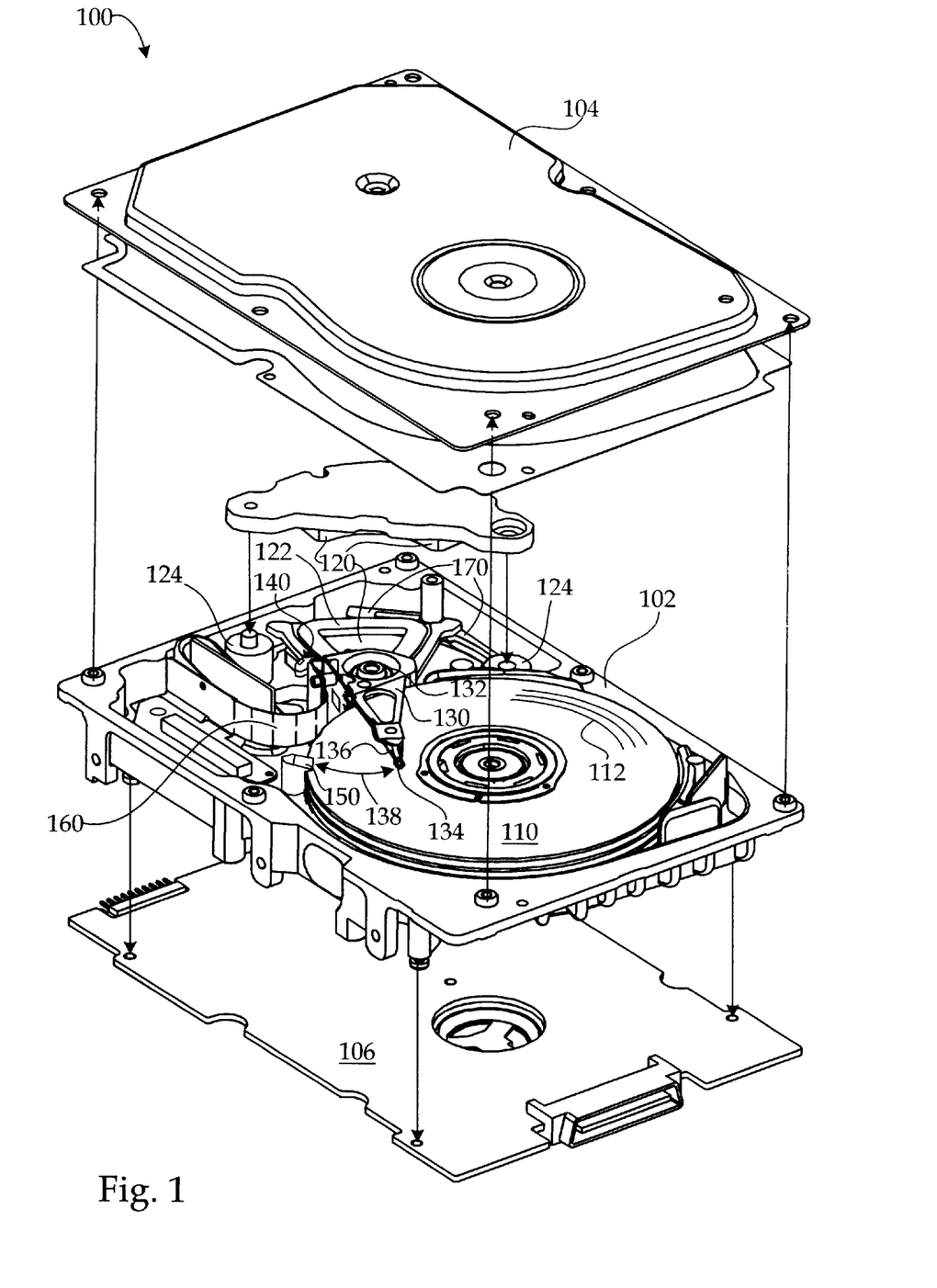
FIG. 1 shows an exploded view of a disc drive incorporating the non-contact magnetic latch.

Turning now to the drawings and specifically to FIG. 1, shown is an exploded view of a disc drive 100 in which the present invention is particularly useful. The disc drive 100 includes a base member 102 to which all other components are directly or indirectly mounted and a top cover 104 which, together with the base member 102, forms a disc drive housing which encloses delicate internal components and isolates these components from external contaminants.

The disc drive includes a plurality of discs 110 which are mounted for rotation on a spindle motor (not shown). The discs 110 include on their surfaces a plurality of circular, concentric data tracks 112 on which data are recorded via an array of vertically aligned head assemblies (one of which is shown at 134). The head assemblies 134 are supported by head suspension tabs 136, which are attached to arm portions of actuator 130. The actuator 130 is mounted for rotation about a pivot shaft 132.

Power to drive the actuator about the pivot shaft 132 is provided by a voice coil motor (VCM). The VCM consists of a coil 122 which is supported by the actuator 130 within the magnetic field of an array of permanent magnets 120 which are fixedly mounted to the base member 102 by support members 124, all in a manner well known in the industry. Electronic circuitry to control all aspects of the operation of the disc drive 100 is provided, with control signals to drive the VCM, as well as data signals to and from the heads 134, carried between the electronic circuitry and the moving actuator assembly via a flexible printed circuit cable (PCC) 160.

The actuator 130 is pivotable through a range of motion 138 across the tracks 112 of the disc 110. When the disc drive 100 is to be powered down, the actuator 130 moves to its park position where the head 134 is near the outer diameter of the disc 110. As the actuator 130 approaches the outer diameter of the discs 110, the head suspension tabs 136 are driven up the sloped surface 152 of ramp 150, thereby distancing the head 134 from the surface of the disc 110 as the actuator 130 moves to its park position.

When the drive 100 is subjected to high levels of rotational shock, the actuator 130 may be held in its park position by a latch 170. Latch 170 may take one of many forms, including inertial latches, magnetic latches, solenoid-activated latches, shape-memory metal latches and aerodynamically activated latches. Where, for example, an inertial latch 170 is implemented, a shock of sufficient magnitude will cause the inertial latch 170 to move into engagement with the actuator 130, thereby preventing movement of the actuator 130 out of the park position. If the shock is of a lesser magnitude, however, the latch 170 may not rotate to lock the actuator 130 in place. For example, low level vibrations might fail to activate the inertial latch 170 but be strong enough to move the actuator 130. As another example, if the latch 170 takes the form of an air latch, it will engage the actuator 130 when the actuator 130 reaches its park position and then release in response to air currents generated by the spinning discs 110 when power is restored to the drive. However, a high level shock to the drive can move the air latch from its latch position, once again leaving the actuator 130 free to rotate in response to a subsequent shock. A secondary latch is therefore provided to maintain the actuator 130 in the park position under conditions which render latch 170 ineffective. This secondary latch is a non-contact magnetic latch mechanism, provided either alone or in combination with a ramp detent, as described below.

Figure 5A:
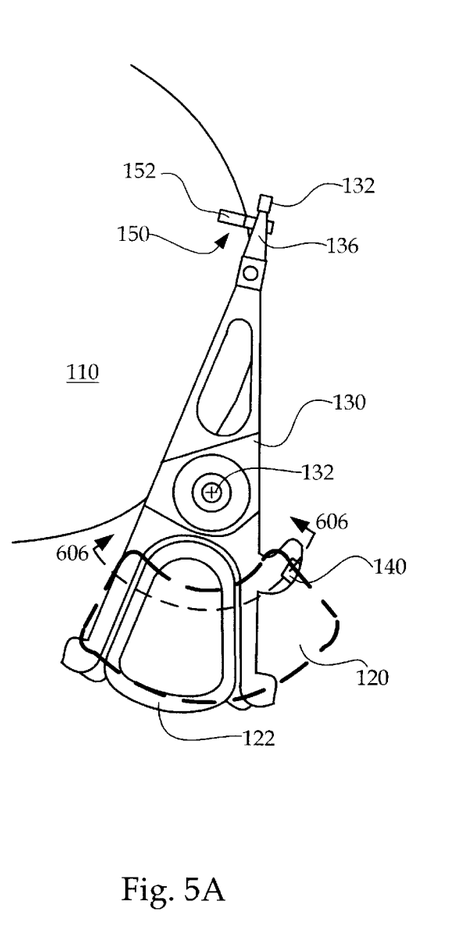
FIG. 5A depicts the actuator relative to the ramp and voice coil magnets when the actuator is in the park position.

The actuator 130 can be seen in its park position in FIG. 5A. The head suspension tab 136 has been driven up the sloped portion 152 of the ramp 150 and the head 134 is supported a safe distance above and away from the surface of the disc 110. The non-contact magnetic latch takes the form of a magnetically permeable element 140 attached to the actuator 130 by insert molding, adhesive or any other conventional attachment method. The element 140 is attached to the actuator 130 at a selected position such that when the actuator 130 is in the park position, the element 140 is attracted by the magnetic field created by upper and lower voice coil magnets 120. A cross-sectional view of the actuator 130, magnets 120 and magnetically permeable element 140 can be seen with the actuator in the park position in FIG. 6. The force of attraction between the element 140 and the magnetic field is strong enough to hold the actuator 130 in its park position when the drive 100 is subjected to low levels of rotation shock, but low enough to be overcome when power is restored to the drive 100 and the VCM is used to move the actuator 130 out of the park position to a read position shown in FIG. 5B.

Figure 5B:
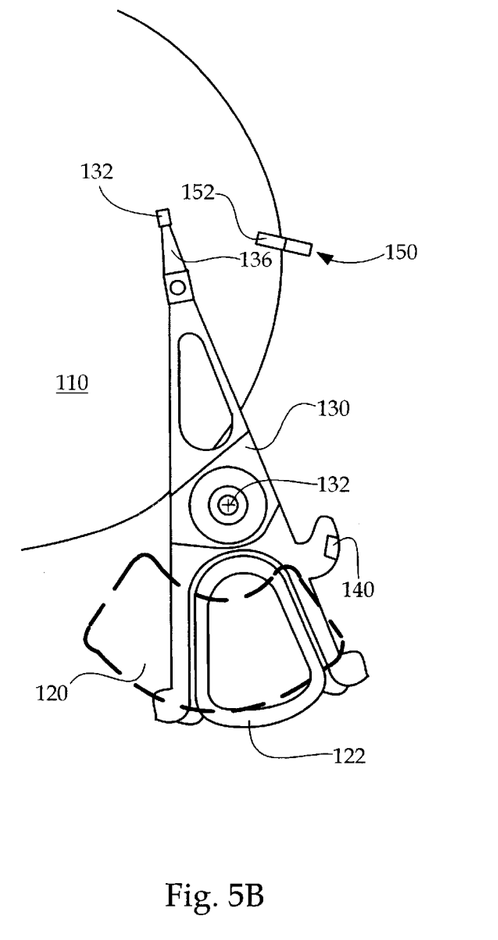
FIG. 5B depicts the actuator relative to the ramp and voice coil magnets when the actuator is in use supporting the head over the disc.
Figure 6:
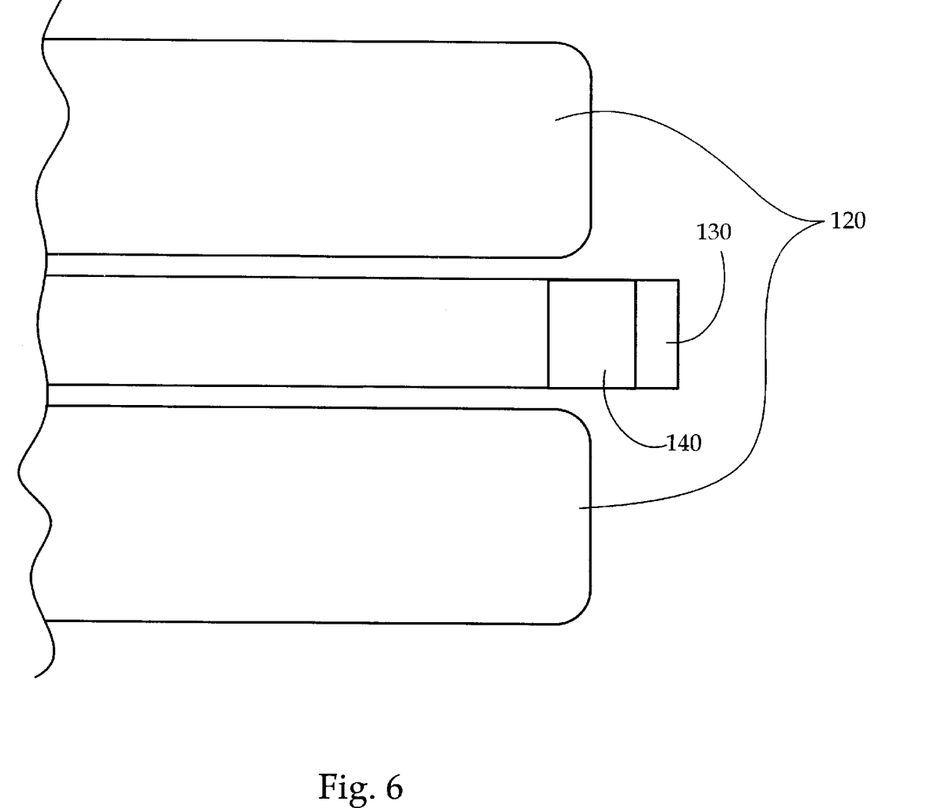
FIG. 6 depicts a cross sectional view of the actuator and voice coil magnets when the actuator is in the park position.

As can be seen in FIGS. 5A and 5B, element 140 is advantageously located between the ends of the actuator, such that it approaches a lateral edge of each of the voice coil magnets 120 as the actuator 130 approaches the park position. This location is important in that it allows the use of conventional arcuate shaped magnets 120 and supports 124 without having to create additional space within the drive 100 to accommodate the secondary latch mechanism.

Figure 7:
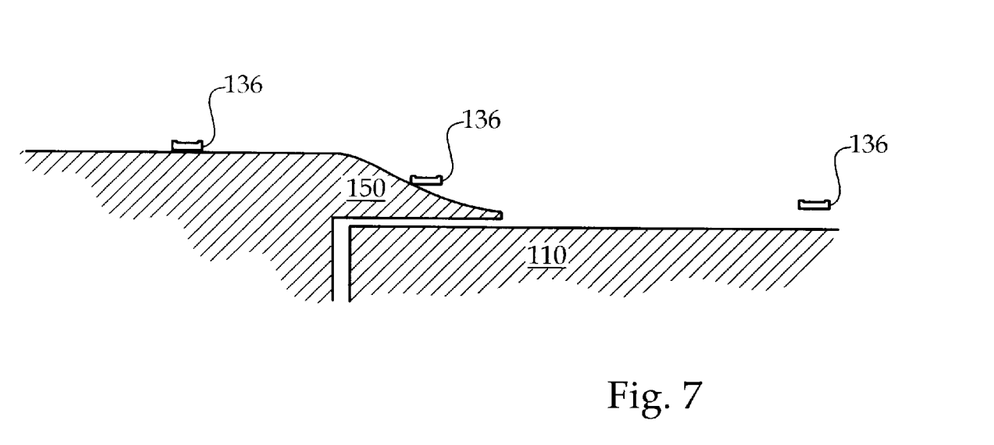
FIG. 7 shows a cross-sectional view of the load suspension tab and ramp of FIG. 3 where the ramp has no detent, illustrating the position of the tab at various points between its park and read positions.
Figure 8:
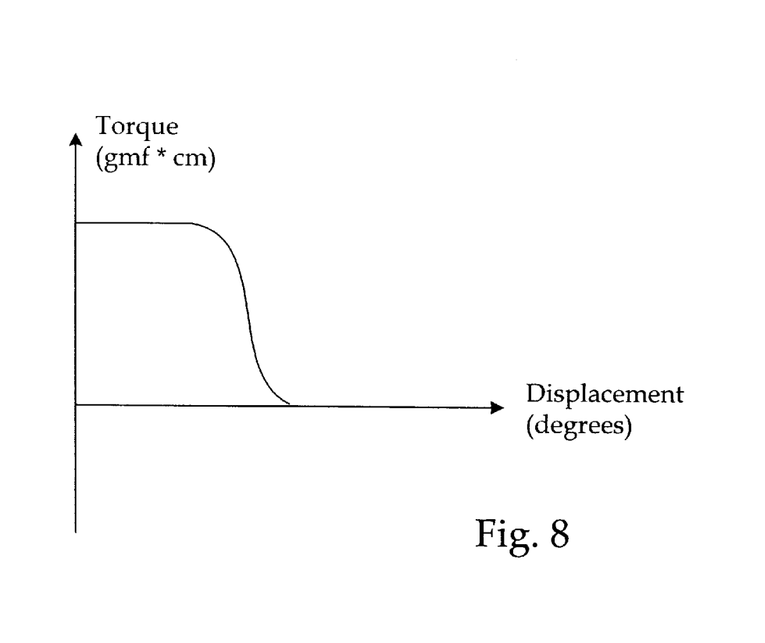
FIG. 8 graphically portrays the latch torque provided by the non-contact magnetic latch versus the angular displacement of the actuator as it leaves the park position as shown in FIG. 3.

One advantage of this non-contact magnetic latch over previous latching designs is that the latch torque and latch range of influence may be easily and predictably varied through proper selection of shape, size and location of the magnetically permeable element 140 on the actuator 130. For example, latch torque could be increased by lengthening element 140 in a direction generally parallel to the lateral magnet edges, so as to increase the surface area exposed to the magnetic field. Latch torque could also be varied by moving element 140 along the length of the actuator 130 so as to vary its distance from actuator pivot 132. The range of influence of the latch may be varied, for example, by changing the length of element 140 along its direction of travel. It should be apparent that both latch torque and range of influence may be fine-tuned relative to one another. This is advantageous in that the magnetic element 140 shape, size and location may be selected so as to provide latch torque right up to the point at which the load suspension tab 136 reaches the top of the ramp, and then be minimized as the suspension load tabs 136 reach the sloped position of the ramp member 150, so as to reduce servo velocity error as the heads 132 are loaded onto the discs 110. This is illustrated in FIG. 7, which shows a load suspension tab 136 in three positions: seated on top of the ramp member at left, descending the sloped ramp surface 152 in the center, and flying above the surface of the disc 110 at right. As may be seen in FIG. 8, proper selection of the shape, size and location of the element 140 produces a substantially constant latch torque until the suspension tab 136 approaches the top of the ramp, at which point the torque diminishes, allowing the head to descend over the disc, thereby minimizing a possible source of servo error.

Other advantages flow from the improved ability to control the range of influence of the non-contact magnetic latch. Use of ramp detents alone has required use of a two-part inertial latch in the past, to compensate for the fact that the actuator 130 could travel only a small angular distance before the detent torque was no longer effective, thereby requiring near immediate inertial latch engagement. The non-contact magnetic latch of the present invention allows lengthening of the range of influence, however, allowing the inertial latch-additional time to engage the actuator. This eliminates the need for a two-part inertial latch, permitting use of a single piece instead, thereby reducing manufacturing and tooling costs, as well as freeing up packaging space in the VCM area of the drive.

Figure 10:
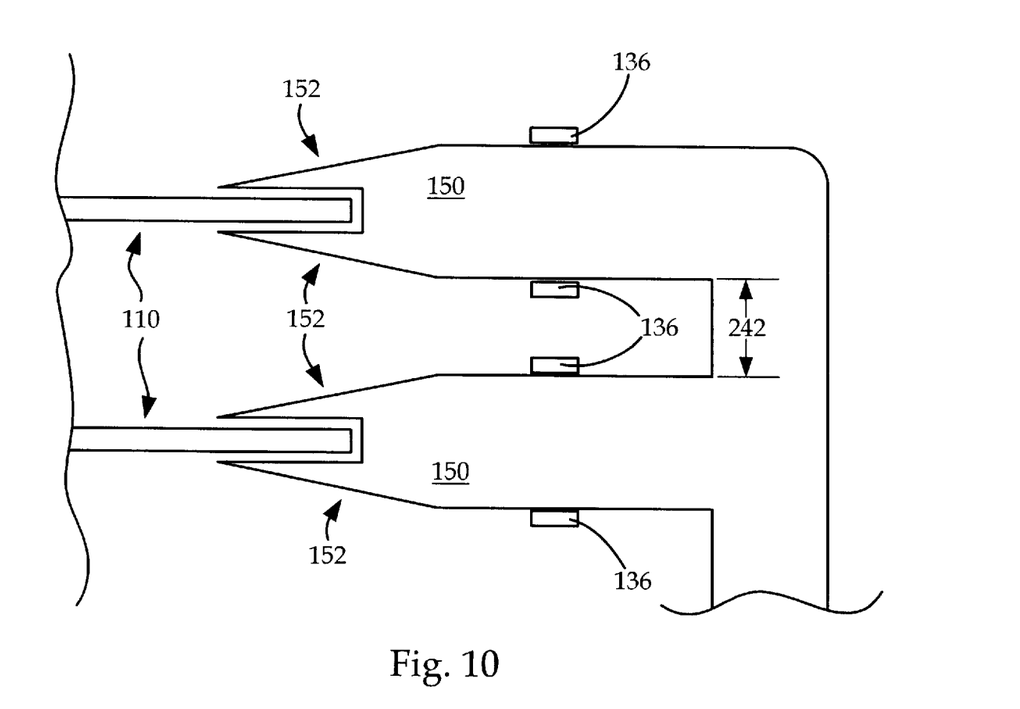
FIG. 10 depicts load suspension tabs seated on the surfaces of corresponding ramp members with no detents.

While it is contemplated that the non-contact magnetic latch be used to supplement a ramp detent, use of the magnetic element 140 alone provides certain additional advantages. Referring to FIG. 10, for example, elimination of the detent entirely reduces distance 242 between ramp surfaces when the actuator 130 is parked. This reduces vertical head acceleration when the drive is subject to shock, thereby lessening the likelihood of resulting head damage.

Another advantage provided by the non-contact magnetic latch 140 is that the latch torque remains substantially the same irrespective of the number of discs 110, heads 132 and ramp members 150 contained in the drive 100. This means that when the disc drive is depopulated, latch torque is not correspondingly decreased and the latch is as effective as it was prior to depopulation.

Alternately characterized, a contemplated embodiment of the invention includes a disc drive 100 which has at least one rotating disc 110, a rotating actuator 130 which carries a head 134 at one end, and at least one voice coil magnet 120 which is used to rotate the actuator 130. The head 134 is configured to fly above a surface of the disc 110. The actuator has a range of motion 138 which includes a park position. The actuator 130 also has a magnetically permeable element 140 attached to it between its ends, and the element 140 is positioned so as to approach the voice coil magnet 120 as the actuator 130 approaches its park position.

Alternately characterized, another contemplated embodiment of the invention includes a disc drive 100 which has at least one rotating disc 110, a rotating actuator 130 which carries a head 134, and at least one voice coil magnet 120 which is used to rotate the actuator 130. The head 134 is configured to fly above a surface of the disc 110. The actuator has a range of motion 138 which includes a park position. The actuator 130 also has a magnetically permeable element 140 attached to it between its ends, and the element 140 is positioned so as to approach the voice coil magnet 120 as the actuator 130 approaches its park position. The torque required to rotate the actuator 130 out of its park position is substantially the same irrespective of the number of heads present in the drive.

It should be apparent that the non-contact magnetic latch of the present invention is advantageously used as a secondary latch in conjunction with a primary latch such as an inertial latch, an air latch, or other conventional actuator latch. However, the scope of the present invention is not envisioned to be limited by the specific mechanism used to provide the primary latching force. It is also contemplated that the non-contact magnetic latch could be configured to serve as the primary actuator latch, either alone or with a detent.

From the foregoing, it is apparent that the present invention is particularly suited to provide the benefits described above. While particular embodiments of the invention have been described herein, modifications to the embodiments which fall within the envisioned scope of the invention may suggest themselves to one of skill in the art who reads this disclosure. Therefore, the scope of the invention should be considered to be limited only by the following claims.

What is claimed is:

1. A disc drive comprising:
    a rotatable actuator having a range of motion including a park position, the actuator further comprising a first end to which a first head is coupled and a second end;
    at least one voice coil magnet configured to rotate the actuator throughout its a range of motion when the disc drive is in use; and
    a magnetically permeable element configured to prevent the actuator from inadvertently rotating out of the park position, the magnetically permeable element being attached to said actuator at a position between the first and second ends thereof, the magnetically permeable element being configured to approach the at least one voice coil magnet as the actuator approaches the park position.

2. The disc drive according to claim 1 wherein the voice coil magnet has inner and outer edges and lateral edges connecting the inner and outer edges, further comprising:
    a pivot axis about which the actuator rotates, wherein the inner and outer edges are radially spaced with respect to the pivot axis, such that the magnetically permeable element approaches one of the lateral edges as the actuator approaches the park position.

3. A disc drive comprising:
    a rotatable actuator coupled to at least one head, the actuator having a range of motion including a park position;
    at least one voice coil magnet configured to rotate the actuator throughout its range of motion when the disc drive is in use;
    a magnetically permeable element attached to said actuator, the magnetically permeable element being configured to approach the at least one voice coil magnet as the actuator approaches the park position; and
    at least one ramp member configured to move the at least one head away from the first disc as the actuator approaches the park position and to support the head when the actuator is in the park position, in which the torque required to move the actuator away from the park position is substantially the same irrespective of the number of heads present in the disc drive.

4. The disc drive according to claim 3, wherein a force of magnetic attraction between the magnetically permeable element and the at least one voice coil magnet when the actuator is in the park position may be varied by selecting the size of the magnetically permeable element and its location upon the actuator.

5. The disc drive according to claim 3, wherein a force of magnetic attraction between the magnetically permeable element and the at least one voice coil magnet is at a maximum F when the actuator is in the park position, and falls to a level of F/10 when the actuator travels an angular distance A away from the park position, such that the distance A may be varied by selecting the size of the magnetically permeable element and its location upon the actuator.

6. The disc drive according to claim 3, wherein a force of magnetic attraction between the magnetically permeable element and the at least one voice coil magnet is at a maximum F when the actuator is in the park position and the head is supported by the first ramp member second surface, and such that the force of magnetic attraction is reduced to a level less than F/10 when the actuator rotates away from the park position a distance such that the head is supported by the first ramp member first surface.

7. The disc drive of claim 3, comprising:
    first and second rotatable discs, the second disc being separated from the first disc by a gap having a minimum thickness T;
    a second head coupled to the actuator assembly configured to fly adjacent the second disc;
    a ramp support attached to the first ramp; and
    a second ramp member coupled to the ramp support and being configured to move the second head toward the first disc as the actuator approaches the park position, the first and second ramps being separated by a gap having a thickness greater than T/4.

* * * * *